(12) United States Patent
Nishihara et al.

(10) Patent No.: US 7,654,380 B2
(45) Date of Patent: Feb. 2, 2010

(54) HANDLING SYSTEM, WORK SYSTEM, AND PROGRAM

(75) Inventors: Yasunori Nishihara, Numazu (JP); Toshihiko Nakane, Numazu (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 190 days.

(21) Appl. No.: 11/472,279

(22) Filed: Jun. 22, 2006

(65) Prior Publication Data

US 2007/0007924 A1 Jan. 11, 2007

(30) Foreign Application Priority Data

Jul. 7, 2005 (JP) ............... 2005-199060

(51) Int. Cl.
| | |
|---|---|
| B65G 15/00 | (2006.01) |
| B65G 9/00 | (2006.01) |
| B07C 5/36 | (2006.01) |
| B07C 5/02 | (2006.01) |

(52) U.S. Cl. ............... 198/349; 198/349.1; 209/556; 209/539; 209/540; 209/542; 209/546; 209/580; 209/583; 209/600; 414/757; 414/768; 414/770; 414/789.1; 414/791.1; 414/791.2; 414/794; 414/794.2

(58) Field of Classification Search ............... 198/349
See application file for complete search history.

(56) References Cited

U.S. PATENT DOCUMENTS 5,040,056 A 8/1991 Sager et al.
5,207,331 A * 5/1993 Teegarden et al. .......... 209/556
6,293,408 B1 * 9/2001 Behnke et al. .............. 209/540
2005/0075752 A1 4/2005 Ban et al.

FOREIGN PATENT DOCUMENTS

| JP | 09072717 | 3/1997 |
|---|---|---|
| JP | 2000219317 | 8/2000 |
| JP | 2005-111607 | 4/2005 |

OTHER PUBLICATIONS

Office Action issued in German Application No. DE 10 2006 031 178.7-15, mailed Sep. 12, 2007.
English translation of German Office Action issued in counterpart German Application No. DE 10 2006 031 178.7-15, mailed Sep. 12, 2007.

* cited by examiner

*Primary Examiner*—Gene Crawford
*Assistant Examiner*—Kavel P Singh
(74) *Attorney, Agent, or Firm*—DLA Piper LLP US

(57) ABSTRACT

A handling system able to efficiently process information relating to a plurality of conveyed articles, the handling system provided with a conveyer for conveying workpieces, a visual sensor for detecting positions of workpieces by acquiring images of a plurality of tracking ranges obtained by dividing a belt into sections, an encoder for detecting an amount of movement of the belt, a tracking manager for monitoring amounts of movement of the plurality of tracking ranges based on the amount of movement detected by the encoder and specifying the tracking range passing through a workpiece detection area, a workpiece manager for selecting the article in the tracking range specified by the tracking manager, and a controller for controlling operations of robots so as to hold the workpiece selected by the workpiece manager.

8 Claims, 9 Drawing Sheets

HANDLING SYSTEM, WORK SYSTEM, AND PROGRAM

CROSS REFERENCES TO RELATED APPLICATIONS

The present invention contains subject matter related to Japanese Patent Application No. 2005-199060 filed in the Japan Patent Office on Jul. 7, 2005, the entire contents of which being incorporated herein by reference.

BACKGROUND OF THE INVENTION

1. Field of Invention

The present invention relates to a handling system, a work system, and a program for selectively picking up a plurality of conveyed articles.

2. Description of the Art

A handling system for detecting workpieces conveyed by a conveyer by a visual sensor and selectively picking up the detected workpieces by a robot is known. Japanese Patent Publication (A) No. 2005-111607 discloses a tracking system for capturing images of workpieces on a conveyer, detecting positions of the workpieces at the time of the imaging from the captured images and specifying the positions of the workpieces at the present point of time from the amount of movement of the conveyer after that. In this tracking system, an image processing system stores position data of the workpieces at the time of the imaging and measurement values of a pulse coder for measuring the movement of the conveyer at the time of the imaging in correspondence. The stored position data of the workpieces at the time of the imaging is transferred from the image processing apparatus to a robot controller. The robot controller searches for and acquires the measurement values of the pulse codes related to the position data of the workpieces using the position data of the workpieces as a key. Then, it rearranges the position data of workpieces from the downstream side based on the position data of the workpieces and the measurement values of the pulse coder and assigns the workpieces to a plurality of robots from the workpieces on the downstream side among the plurality of workpieces for handling.

Japanese Patent Publication (A) No. 2005-111607 performs processing such as specifying which workpieces are located on the downstream side and specifying the positions of the workpieces at the present point of time by uniformly managing the position data of all workpieces and searching for the data related to the position data. Accordingly, the data of the workpieces cannot be efficiently processed.

For example, when a plurality of workpieces are captured in a single image, the measurement values of the pulse coder become the same for the plurality of workpieces, but the same measurement value is retrieved and specified for each workpiece, therefore the same processing is executed overlappingly. The search of the measurement value of the pulse coder and the rearrangement of the position data must be carried out for all workpieces including workpieces relatively upstream from the robot, therefore the processing load unnecessarily increases. It is difficult to provide the user with additional information of the workpieces (for example the type of the workpieces) for a predetermined range on the conveyer.

SUMMARY OF THE INVENTION

In the present invention, it is therefore desirable to provide a handling system, a work system, and a program able to efficiently process information concerning a conveyed plurality of articles.

According to the present invention, there is provided a handling system comprising a conveying part for moving a carrying part on which a plurality of articles are carried along a conveyance path and thereby conveying said plurality of articles; a visual sensor for repeating imaging of an imaging region set in said conveyance path at a predetermined time interval, acquiring images in a plurality of tracking ranges obtained by dividing said carrying part in a conveyance direction, and detecting relative positions of articles within each tracking range with respect to each tracking range based on each acquired image; a movement amount detecting part for detecting an amount of movement of said carrying part; a tracking range monitoring part for monitoring the amounts of movement of said plurality of tracking ranges from said imaging region based on the amount of movement detected by said movement amount detecting part and specifying the tracking range passing through a predetermined detection area; an article selecting part for selecting an article satisfying a predetermined selection condition within the tracking range specified by said tracking range monitoring part; a handling part for selectively picking up articles carried on said carrying part; and a controlling part for controlling the operation of said handling part so as to pick up the article selected by said article selecting part.

Preferably, the system is further provided with a data managing part for generating a plurality of tracking data corresponding to individual tracking ranges and a storing part for storing said plurality of tracking data generated by said data managing part, said tracking data includes movement amount information able to specify the amount of movement of a corresponding tracking range from said imaging region, and, when there are any articles in the corresponding tracking range, further includes the same number of article data as the number of articles within the corresponding tracking range, said article data includes article position information able to specify the relative position of a corresponding article with respect to said tracking range, said data managing part updates said movement amount information stored in said storing part based on the amount of movement detected by said movement amount detecting part, the tracking range monitoring part monitors the amount of movement of said tracking range from said imaging region with reference to said movement amount information of said tracking data and specifies the tracking data of the tracking range passing through said detection area, said article selecting part selects article data satisfying said selection condition with reference to the article data included in the tracking data specified by said tracking range monitoring part, and said controlling part specifies the relative position of said article with respect to said handling part based on said movement amount information included in the tracking data specified by said tracking range monitoring part and said article position information included in the article data selected by said article selecting part and makes said handling part follow said article.

Preferably, said visual sensor specifies additional information concerning the appearance of said article based on said image, said data managing part generates said tracking data so that said additional information of the article is included in the article data corresponding to the article, and said article selecting part selects the article data satisfying said selection condition with reference to said additional information of said article data included in the tracking data specified by said tracking range monitoring part.

Preferably, said visual sensor specifies additional information concerning the appearance of said article based on said image, said data managing part generates said tracking data so that said additional information of the article is included in the article data corresponding to the article, and said controlling part makes said handling part execute different operations in accordance with the content of the additional information with reference to the additional information of the article data selected by said article selecting part.

Preferably, the system is further provided with a display device for displaying predetermined information, said visual sensor specifies additional information concerning the appearance of said article based on said image, said data managing part generates said tracking data so that said additional information of the article is included in the article data corresponding to the article, and said display device displays the additional information of the article data selected by said article selecting part.

Preferably, said additional information is information able to specify the type of said article.

According to the present invention, there is provided a work system comprising a conveying part for moving a carrying part on which a plurality of articles are carried along a conveyance path and thereby conveying said plurality of articles; a visual sensor for repeating imaging of an imaging region set in said conveyance path at a predetermined time interval, acquiring images in a plurality of tracking ranges obtained by dividing said carrying part in a conveyance direction, and detecting relative positions of articles within each tracking range with respect to each tracking range based on each acquired image; a movement amount detecting part for detecting an amount of movement of said carrying part; a tracking range monitoring part for monitoring the amounts of movement of said plurality of tracking ranges from said imaging region based on the amount of movement detected by said movement amount detecting part and specifying the tracking range passing through a predetermined detection area; an article selecting part for selecting an article satisfying a predetermined selection condition within the tracking range specified by said tracking range monitoring part; a work part for selectively performing work on articles carried on said carrying part; and a controlling part for controlling the operation of said work part so as to performing work on the article selected by said article selecting part.

According to the present invention, there is provided a program for making a computer connected to a visual sensor for repeating imaging of an imaging region set in a conveyance path through which a carrying part on which a plurality of articles are carried at a predetermined time interval, acquiring images in a plurality of tracking ranges obtained by dividing said carrying part in a conveyance direction, and detecting relative positions of articles within each tracking range with respect to each tracking range based on each acquired image, a movement amount detecting part for detecting an amount of movement of said carrying part, and a handling part for selectively picking up articles carried on said carrying part function as a tracking range monitoring part for monitoring the amounts of movement of said plurality of tracking ranges from said imaging region based on the amount of movement detected by said movement amount detecting part and specifying the tracking range passing through a predetermined detection area, an article selecting part for selecting an article satisfying a predetermined selection condition within the tracking range specified by said tracking range monitoring part, and a controlling part for controlling the operation of said handling part so as to pick up the article selected by said article selecting part.

According to the present invention, information concerning the conveyed plurality of articles can be efficiently processed.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Figure 1:
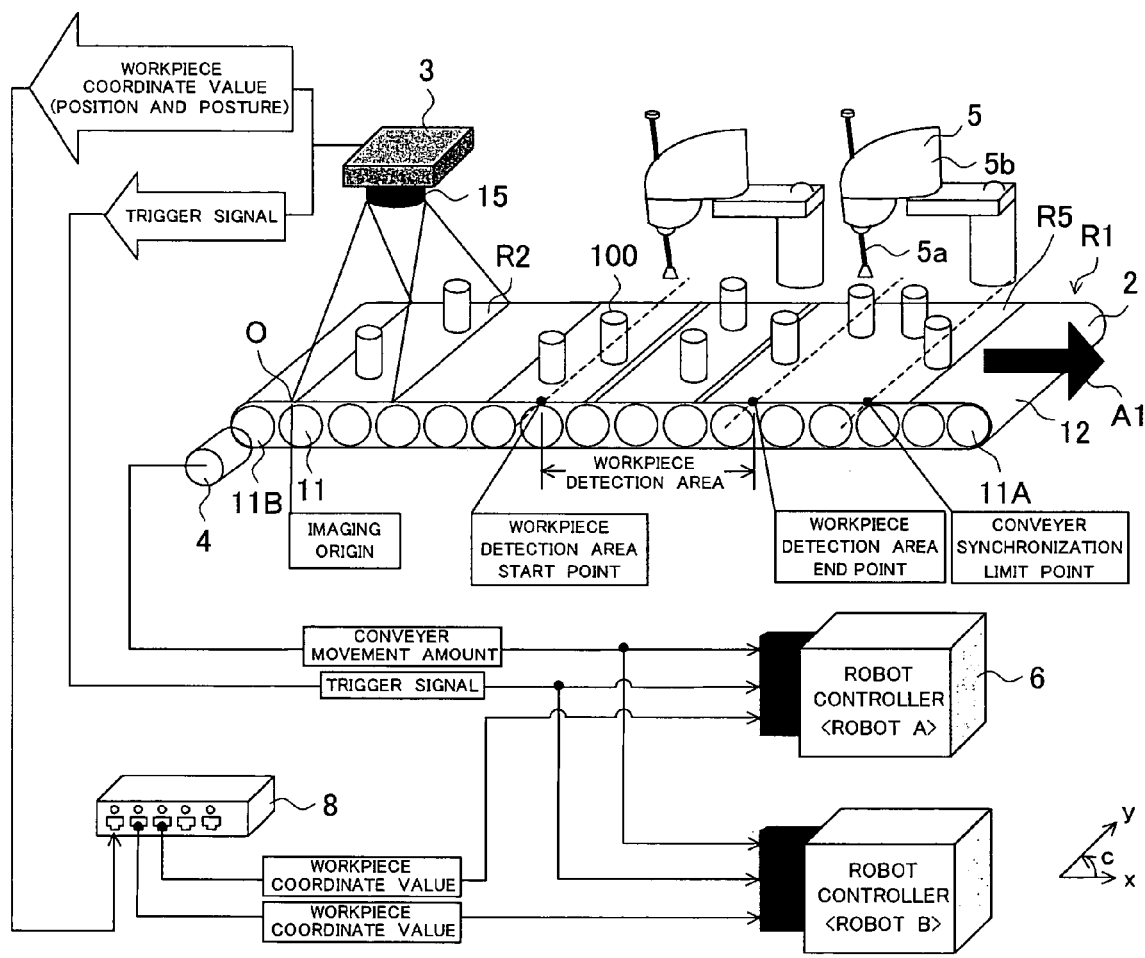
FIG. 1 is a schematic view of the overall configuration of a handling system according to an embodiment of the present invention.

FIG. 1 is a schematic view of the configuration of a handling system 1 of an embodiment of the present invention. The handling system 1 is provided with a conveyer 2 for conveying a plurality of workpieces 100, a visual sensor 3 for detecting positions of the workpieces 100 conveyed by the conveyer 2, an encoder 4 for detecting the amount of movement of the conveyer 2, a plurality of robots 5 for taking out the workpieces 100 from the conveyer 2, and a plurality of robot controllers 6 for controlling operations of the plurality of robots 5 based on detection results of the visual sensor 3 and the encoder 4. Note that the conveyer 2 is an example of the conveying part, the encoder 4 is an example of the movement amount detecting part, the robots 5 are examples of the handling parts, and the robot controllers 6 are examples of the data managing parts, the tracking range monitoring parts, the article selecting parts, and the controlling parts.

The conveyer 2 is constructed by for example a belt conveyer and is provided with a plurality of rollers 11 aligned in a conveyance direction A1 and a belt 12 passed over the rollers 11. Note that the belt 12 is an example of the carrying part. By the rotation of rollers 11A and 11B etc. located at the two ends among the plurality of rollers 11 by a not shown motor, the belt 12 moves in the conveyance direction A1 whereby the workpieces 100 carried on the belt 12 are conveyed.

Figure 2:
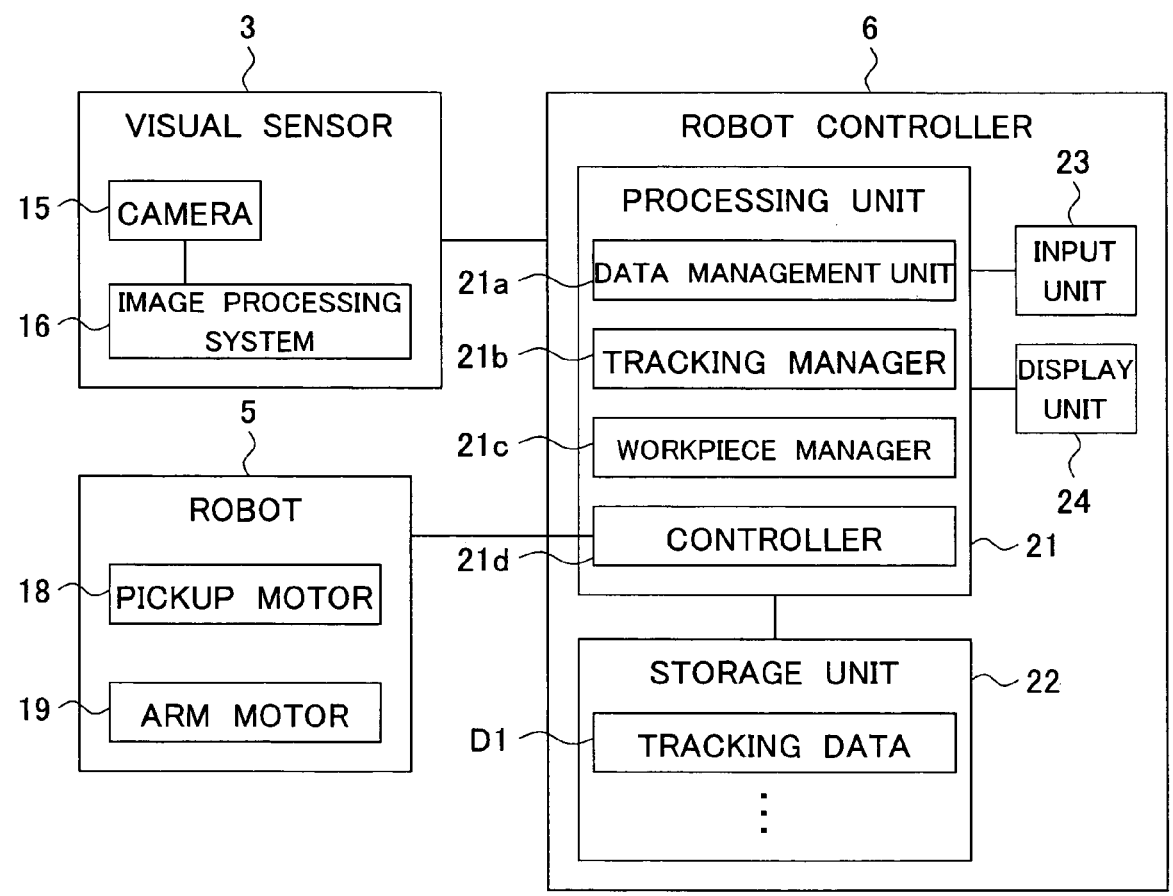
FIG. 2 is a block diagram of the configuration of a signal system of the handling system of FIG. 1.

The visual sensor 3 is, as shown in FIG. 2, provided with a camera 15 and an image processing apparatus 16 for processing an image captured by the camera 15 and detecting a position of a workpiece. The camera 15 is configured by for example a charge coupled device (CCD) camera and outputs an electric signal in accordance with light received by the CCD to the image processing apparatus 16. The image processing apparatus 16 is configured by a computer including for example a not shown central processing unit (CPU), random access memory (RAM), and read only memory (ROM). By the CPU running the program stored in the ROM, various types of part for the image processing are constructed. Note that the camera 15 and the image processing apparatus 16 may be provided in one housing and integrally configured or may be provided in different housings and arranged at positions relatively far away from each other.

As shown in FIG. 1, the camera 15 of the visual sensor 3 captures an image of part of the range on the upstream side of a conveyance path R1 prescribed by a width of the belt 12 and a length from the roller 11A to the roller 11B as an imaging region R2. Note that the width of the imaging region R2 (direction perpendicular to the conveyance direction A1) is equivalent to for example the width of the belt 12. The length of the imaging region R2 (conveyance direction A1) may be appropriately set by considering various conditions such as the precision of the visual sensor 3. The visual sensor 3 repeats the imaging of the imaging region R2 at a predetermined time interval. Due to this, images of a plurality of tracking ranges R5 obtained by dividing the belt 12 in the conveyance direction A1 are acquired. The time interval is for example a length where the amount of movement of the belt 12 becomes substantially equal to the length of the imaging region R2 in the conveyance direction. Due to this, the tracking ranges R5 are set without overlap and clearance and images of the belt 12 are efficiently captured.

Note that the plurality of tracking ranges R5 may partially overlap each other or a clearance may be provided between them. The relative positions among the plurality of tracking ranges R5 may be constant or may change. When the relative positions among the plurality of tracking ranges R5 are made constant, the belt 12 may be moved at a constant speed and the time intervals of imaging may be made constant or the speed of the belt 12 may be changed based on a density of workpieces 100 on the belt 12 and the processing speed of the robot 5 and the time interval of the imaging may be changed in accordance with the speed of the belt 12.

The image processing apparatus 16 of the visual sensor 3 processes the image captured by the camera 15 and thereby detects the relative position of a workpiece 100 in the tracking range R5 (imaging region R2) with respect to a predetermined position (for example imaging origin O) within the tracking range R5. For example, it extracts the profile of the workpiece 100 by edge processing the image and specifies a coordinate value x in the conveyance direction A1, a coordinate value y in a direction perpendicular to the conveyance direction A1, and a coordinate value c in a rotation direction around an axis perpendicular to an x-y plane based on a predetermined position of the imaging range from the extracted profile.

The visual sensor 3 is connected via a HUB 8 to the robot controllers 6. Namely, the visual sensor 3 and the robot controllers 6 are connected by a star formed LAN, and signals from the visual sensor 3 are output to the plurality of robot controllers 6 by parallel communication. Due to this, high speed communication of the data become possible while maintaining an inexpensive configuration by using a conventional visual sensor. Note that the standard of the LAN is for example the Ethernet®.

Signals including the information of the coordinate values (x, y, z) of the workpieces 100 explained above are output from the visual sensor 3 to the robot controllers 6. Further, signals for notifying the timing of imaging by the camera 15 are output to the robot controllers 6. The signals are for example trigger signals output to the robot controllers 6 simultaneously with the imaging by the camera 15. Note that if the trigger signals are set so that the robot controllers 6 can recognize the trigger signals by distinguishing them from other signals, the trigger signals may be signals having appropriate patterns. Further, it is also possible to output signals including information of the imaging time to the robot controllers 6 at suitable times to determine the imaging timing. The signals of the coordinate values and trigger signals are output to each of the plurality of robot controllers 6, and the information is shared by the plurality of robot controllers 6.

The encoder 4 is attached to for example a not shown motor for driving the rollers 11 or to a roller 11 driven to rotate by the motor and outputs a pulse sequence in accordance with the rotation of the motor etc. The encoder 4 is connected to the robot controllers 6, and the robot controllers 6 count pulses from the encoder 4 to specify the amount of movement of the belt 12.

Each robot 5 is provided with a pickup part 5a for picking up a workpiece 100 and an arm part 5b for moving the pickup part 5a with respect to the conveyance path R1. The pickup part 5a can selectively pick up one workpiece 100 among a plurality of workpieces 100 on the belt 12 by an appropriate pickup method such as clamping or suction holding of the workpiece 100. Note that the picked up part 5a may be one that can selectively pick up two or more workpieces 100. In the arm part 5b, the length of the arm and the degree of freedom of the joint are set so that the pickup part 5a can be moved in a synchronizable area R11 (see FIG. 4) on the conveyance path R1. The plurality of robots 5 are provided adjacent to the conveyance path R1. Note that the plurality of robots 5 may be arranged along the conveyance direction A1, or the plurality of robots 5 may be arranged while sandwiching the conveyance path R1 between them.

The plurality of robot controllers 6 are provided corresponding to the plurality of robots 6 and control operations of the robots 5 connected to them. Note that, in FIG. 1, two robot controllers 6 for controlling operations of two robots 5 are illustrated. Note that the operations of the plurality of robots 5 may be controlled by one robot controller 6 as well.

FIG. 2 is a block diagram of the configuration of a signal system for part of the handling system 1. The robot controller 6 is provided with a processing unit 21 for performing various types of processing, a storage unit 22 for storing predetermined data, an input unit 23 for accepting an input operation of the user, and a display unit 24 for displaying the predetermined information.

The robot controllers 6 are configured by computers including for example not shown CPUs, ROMs, RAMs, and external storage units. By a CPU running the program stored in the ROM etc., a processing unit 21 including various types of part such as a data management unit 21a, tracking manager 21b, workpiece manager 21c, and controller 21d is constructed. Note that the tracking manager 21b is an example of the tracking monitoring part, and the workpiece manager 21c is an example of the article selecting part.

The data management unit 21a generates, updates, erases, etc. the tracking data D1 stored in the storage unit 22. The content of the tracking data D1 will be explained later. The tracking manager 21b monitors the position of the tracking range R5 with reference to the tracking data D1. The workpiece manager 21c searches for (selects) the workpiece 100 with reference to the tracking data D1. The controller 21d controls the operation of the robot 5 based on the information etc. of the workpiece 100 selected by the tracking manager 21c. Specifically, it controls the operations of a pickup motor 18 for driving the pickup part 5a and an arm motor 19 for driving the arm part 5b.

The storage unit 22 is configured by for example a RAM in which data is read and written by the processing unit 21. The input unit 23 is configured by a key switch etc. and outputs a signal in response to an input operation of the user to the processing unit 21. The display unit 24 is configured by for example a liquid crystal display or a CRT display and displays an image based on a signal from the processing unit 21.

Figure 3:
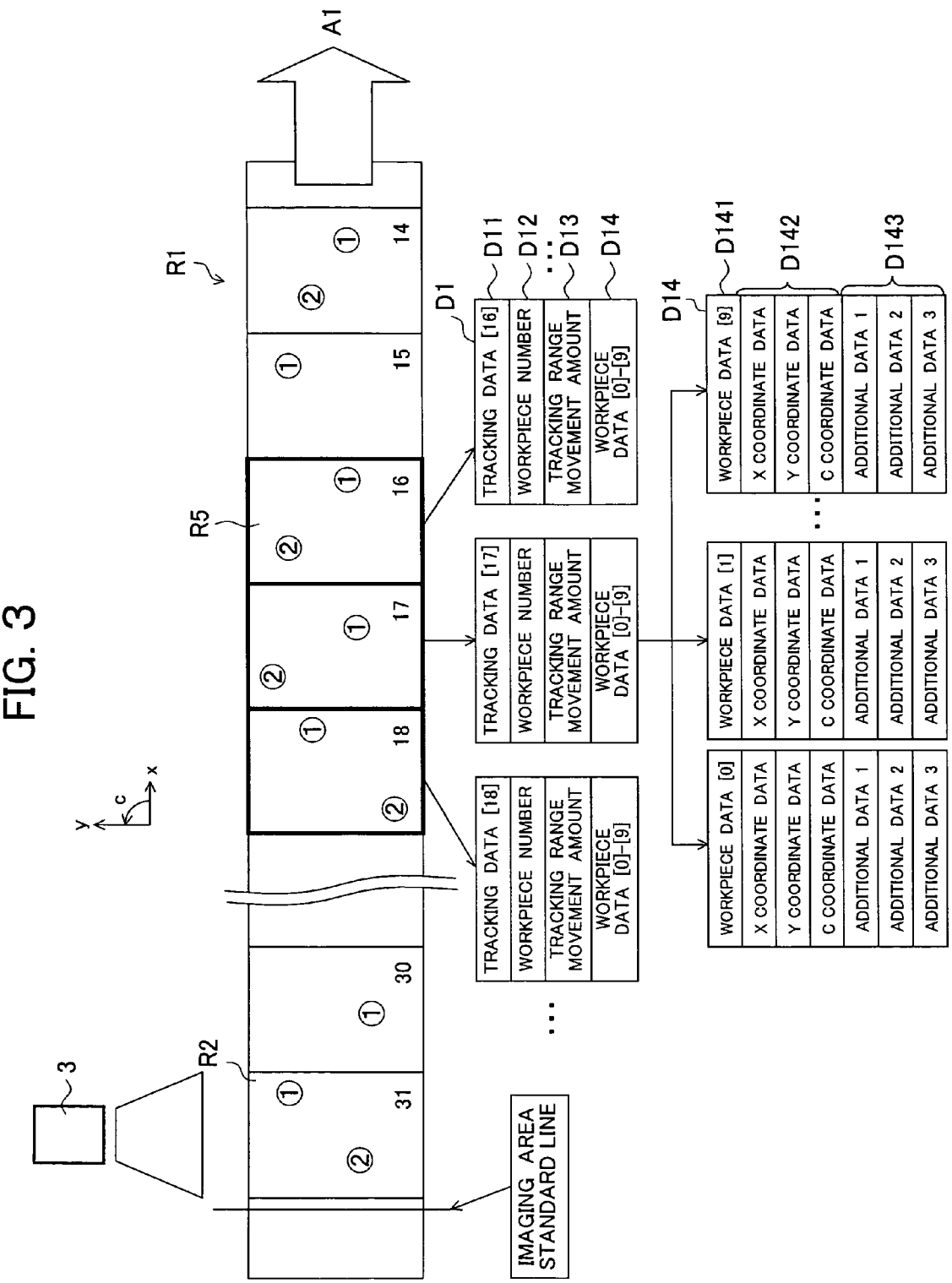
FIG. 3 is a conceptual view of the configuration of tracking data recorded in a robot controller of the handling system of FIG. 1.

FIG. 3 is a conceptual view of the content of the tracking data D1. A plurality of tracking data D1 are generated corresponding to the plurality of tracking ranges R5. Each tracking data D1 includes a track number D11 as an index for facilitating reference to the tracking data D1, a workpiece number D12 as information for specifying the number of workpieces 100 within the tracking range R5, a tracking range movement amount D13 as information for specifying the amount of movement of the tracking range R5, and workpiece data D14 including various information concerning the workpieces 100 within the tracking range R5.

For the tracking number D11, for example use is made of an integer incremented by "1" by the processing unit 21 whenever imaging is carried out by the visual sensor 3 and a trigger signal is output. Namely, serial numbers are sequentially attached from the head side tracking range R5 of the conveyance direction A1. FIG. 3 illustrates a case where the tracking number D11 is the suffix of array data.

The workpiece number D12 is generated by the visual sensor 3 detecting the number of workpieces 100 included in one image and outputting this to the robot controller 6 and by the data management unit 21a of the robot controller 6 recording it in the storage unit 22.

The tracking range movement amount D13 is data whose initial value (for example 0) is stored in the storage unit 22 when the visual sensor 3 performs imaging and outputs the trigger signal and then is updated by adding the amount of movement of the belt 12 detected by the encoder 4. In other words, the tracking range movement amount D13 is position data of the tracking range R5 in the conveyance direction A1 based on the imaging region R2.

The workpiece data D14 is included tracking data D1 in a in exactly the same number as the number of the workpieces 100 in the corresponding tracking range R5 and is generated corresponding to each of the workpieces 100. Note that FIG. 3 illustrates a case where the same number of workpiece data D14 as the number of workpieces 100 is generated by securing the storage regions for the workpiece data D14 by 10 elements of array data and entering information into the same number of elements as the number of the workpieces 100 in them. Note that the storage regions for just the amount in accordance with the number of the workpiece data D14 may be secured.

The workpiece data D14 is generated by transferring data generated by the visual sensor 3 to the robot controllers 6 and having the data management units 21a of the robot controllers 6 record the data in the storage units 22. Note that the data generated by the visual sensor 3 and the workpiece data D14 may be exactly the same data or may differ in data format etc.

The workpiece data D14 includes a workpiece number D141 as an index for facilitating reference to the workpiece data D14, coordinate data D142 able to specify the relative position of a workpiece 100 with respect to the tracking range R5, and additional data D143 including other appropriate information concerning the workpiece 100.

For the workpiece number D141, for example, use is made of an integer incremented whenever a workpiece 100 is detected based on one image obtained by the visual sensor 3. Namely, serial numbers are assigned to a plurality of workpieces 100. FIG. 3 illustrates a case where the workpieces 100 are detected from the downstream side and smaller numbers are assigned to the workpieces 100 at the further downstream side or a case where the numbers are assigned again by the visual sensor 3 or the robot controllers 6 so that serial numbers are given from the downstream side. Further, FIG. 3 illustrates a case where the workpiece number D141 is the suffix of the array data.

The coordinate data D142 includes for example the coordinate value x, coordinate value y, and coordinate value c detected by the visual sensor 3.

The additional information D143 includes for example information concerning the appearance of a workpiece 100 specified based on the image captured at the visual sensor 3. For example, the visual sensor 3 specifies the type of the workpiece 100 and generates it as additional information. Specifically, it compares the profile of the workpiece 100 extracted by for example edge processing and the previously registered profiles to specify the type of the workpiece 100. Note that a case where three additional information are included for each workpiece 100 is illustrated.

Figure 4:
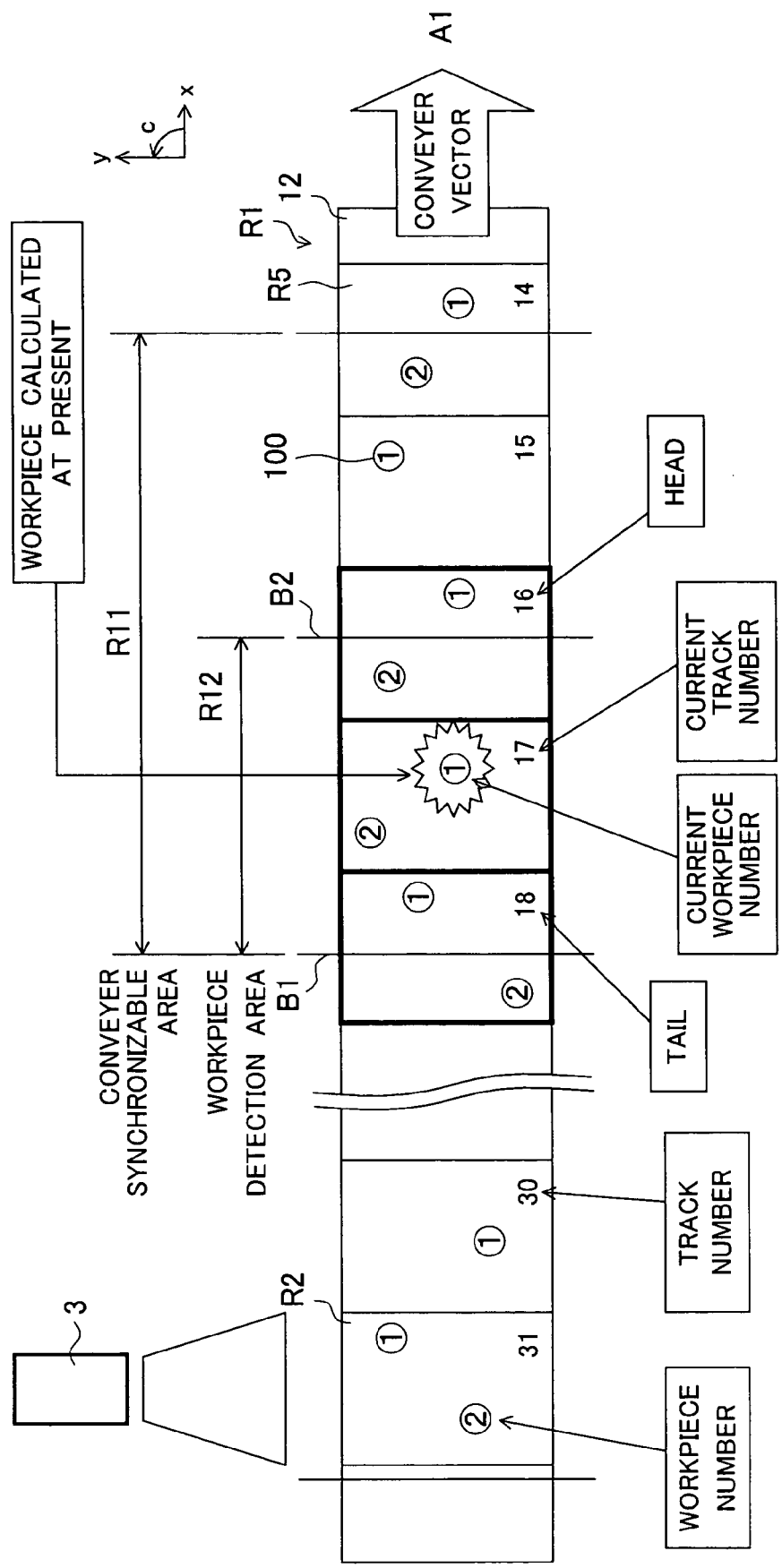
FIG. 4 is a conceptual view of the operation of the handling system of FIG. 1.

FIG. 4 is a conceptual view for explaining the operation of the handling system 1. Note that, in the following description, the operation of one robot 5 and robot controller 6 among the plurality of robots 5 and robot controllers 6 will be explained.

As explained above, the belt 12 moves in the conveyance direction A1, whereby the visual sensor 3 repeatedly captures images of the imaging region R2 to thereby detect the workpieces 100 of each tracking range R5. The data management unit 21a of the robot controller 6 sequentially generates tracking data D1 corresponding to the tracking ranges R5. The track numbers D11 of the tracking data D1 (tracking ranges R5) are assigned serial numbers in the sequence of imaging by the visual sensor 3, that is, in the sequence from the downstream side. FIG. 4 illustrates a state where tracking ranges R5 having track numbers 14 to 31 move on the conveyance path R1. Further, the workpiece numbers of the workpiece data D14 included in the tracking data D1 are sequentially assigned serial numbers from the downstream side. FIG. 4 illustrates a state where one or two workpieces 100 are arranged on one tracking range R5, and the workpiece number of 1 or 2 is assigned.

The robot 5 can acquire the workpieces 100 moving through the conveyer synchronizable area R11 among workpieces 100 moving over the conveyance path R1. The conveyer synchronizable area R11 is determined based on the arrangement position of the robot 5 and the length of the arm part 5b of the robot 5 etc.

The robot controller 6 previously receives as input the position information of the workpiece detection area R12 set at the appropriate position and length with respect to the conveyer synchronizable area R11. Then, the tracking manager 21b of the robot controller 6 specifies the tracking range R5 passing through the workpiece detection area R12 among a plurality of tracking ranges R5, and the workpiece manager 21c selects the workpiece 100 to be picked up by the robot 5 in the specified tracking range R5.

Specifically, the tracking manager 21b specifies the tracking number of the head (downstream side) tracking range R5 in the workpiece detection area R12 and the tracking number of the tail (upstream side) tracking range R5 in the workpiece detection area R12 among a plurality of tracking ranges R5. In the following description, these head tracking number and tail tracking number will be sometimes referred to as just the "head" and "tail".

FIG. 4 illustrates a case where when at least a part of the tracking range R5 is in the workpiece detection area R12, the range is regarded as passing through the workpiece detection area R12. Note that it is also possible to regard the tracking range R5 as passing through the workpiece detection area R12 where at least a predetermined percentage of the tracking range R5 is in the workpiece detection area R12.

A borderline B1 on the upstream side of the workpiece detection area R12 is set for example at the same position as the borderline on the upstream side of the conveyer synchronizable area R11. Further, a borderline B2 on the upstream side of the workpiece detection area R12 is set for example by reversely calculating a distance necessary for the robot 5 to accelerate the pickup part 5a in the stopped state up to the speed of the workpieces 100 on the belt 12, or a distance of movement of the belt 12 during a period where the pickup part 5a stopped on one side end (top of sheet of FIG. 4) of the belt 12 picks up a workpiece 100 carried on the other side end (bottom of sheet of FIG. 4) of the belt 12, from the borderline on the downstream side of the conveyer synchronizable area R11. FIG. 4 illustrates a case where the workpiece detection area R12 has a size of a about two tracking ranges R5. The workpiece detection area R12 may be set for each robot 5 or may be commonly set for a plurality of robots 5.

The robot controller 6 searches for workpieces 100 from the head to tail track number tracking ranges R5. Then, the retrieved workpieces 100 are subjected to various processing such as pickup control by the robot 5. Note that these workpiece 100 and tracking range R5 being processed will be referred to as the "current workpiece" and "current tracking range", while the workpiece number of the current workpiece and the track number of the current tracking range will be sometimes referred to as the "current workpiece number" and "current track number".

The current workpiece is basically the downstream most workpiece 100 among the workpieces 100 within the head to tail track number tracking ranges R5, while the current tracking range is the tracking range R5 including the current workpiece.

Note that the robot controller 6 can specify only a workpiece 100 matching with a search condition specified by the user by operation of the input unit 23 as a current workpiece. Whether or not the workpiece 100 matches with the search condition is judged by comparison of the search condition and the additional information D143. Accordingly, for example, the robot controller 6 specifies only a specific type of workpiece 100 as the current workpiece.

Note that when the user does not designate a search condition of the workpiece 100, the robot controller 6 selects the workpiece 100 from the downstream side as explained above and makes the display unit 24 display the content of the additional data D143 of the workpiece 100.

Further, the robot controller 6 performs tracking control of the robot 5 to the current workpiece, detects the workpiece 100 to next become the current workpiece, and displays the content etc. of the additional data D143 of the detected workpiece 100 on the display unit 24.

The above operation is accomplished by the robot controller 6 executing the processing illustrated below.

Figure 5:
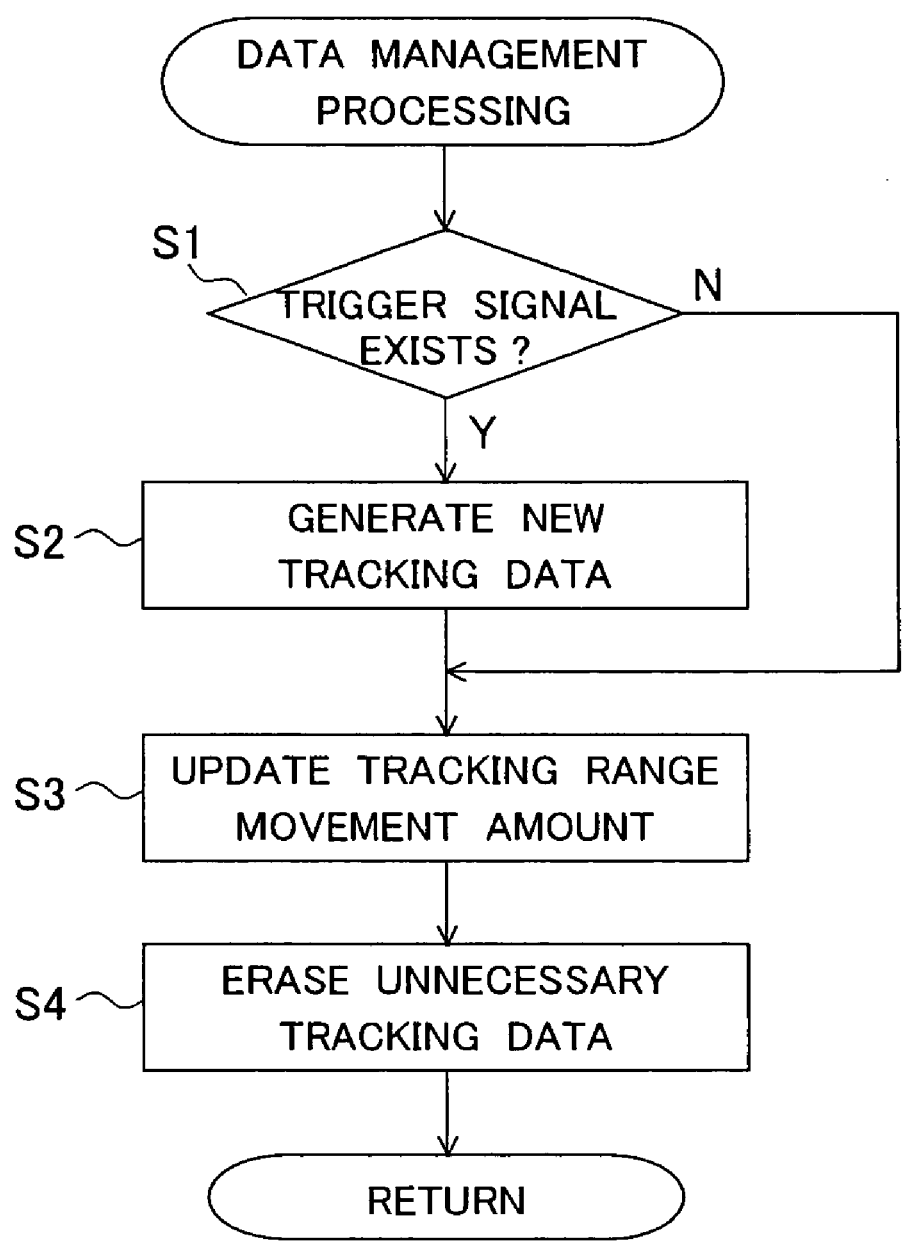
FIG. 5 is a flow chart of the routine of data management processing executed by a robot controller of the handling system of FIG. 1.

FIG. 5 is a flow chart of the routine of the data management processing executed by the processing unit 21 of the robot controller 6. This processing is started at the time of for example activation of the handling system 1 and is repeatedly executed at a constant cycle (for example 0.1 second). Note that the processing unit 21 of the robot controller 6 functions as the data management unit 21a when executing the data management processing.

At step S1, the processing unit 21 judges the presence of the trigger signal output from the visual sensor 3 simultaneously with the imaging. When judging that there is a trigger signal, it newly generates the tracking data D1 based on the coordinates and information of the type of the workpiece 100 detected and output by the visual sensor 3 and records it in the storage unit 22 (step S2). When judging that there is no trigger signal, it skips step S2.

At step S3, the processing unit 21 adds the amount of movement of the tracking range R5 based on the count of pulses output by the encoder 4 from the time of execution of the previous data management processing to the value of the tracking range movement amount D13 of each tracking data D1 so as to update the tracking range movement amount D13. Note that it does not update the tracking data D1 generated this time.

At step S4, if there is tracking data D1 which becomes unnecessary, the processing unit 21 opens up the storage region of the tracking data D1. For example, it erases the tracking data D1 of the tracking range R5 located on the downstream side from the conveyer synchronizable area R11. Note that it is also possible not to open up the storage region, but to overwrite new tracking data D1 in the storage region of the tracking data D1 of the tracking range R5 located at the downstream side from the conveyer synchronizable area R11 at step S2.

Figure 6:
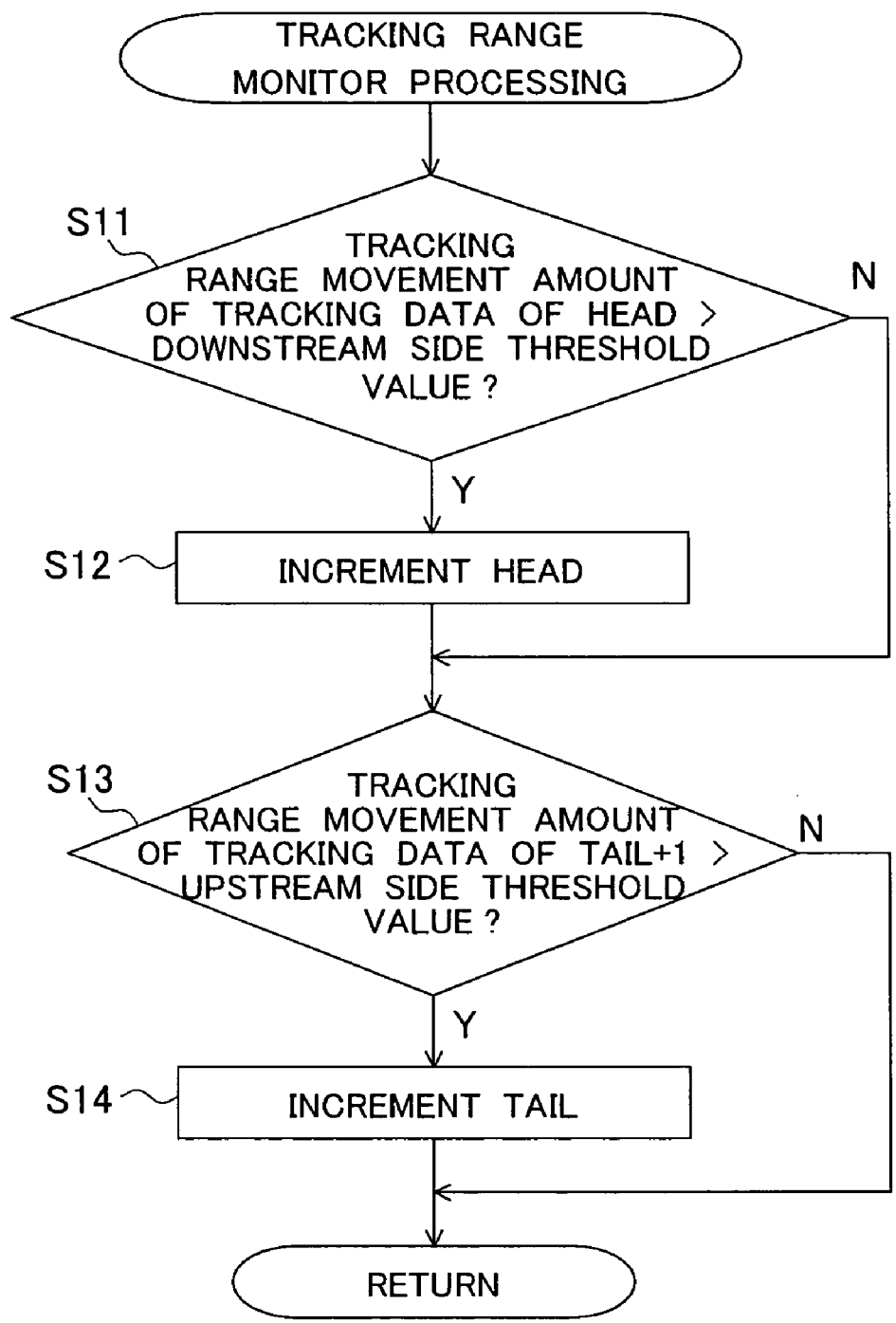
FIG. 6 is a flow chart of the routine of tracking range monitor processing executed by a robot controller of the handling system of FIG. 1.

FIG. 6 is a flow chart of the routine of the tracking range monitor processing executed by the processing unit 21 of the robot controller 6. This processing is started at the time of for example the activation of the handling system 1 and repeatedly executed at the constant cycle (for example 0.1 second). The processing unit 21 of the robot controller 6 functions as the tracking manager 21b when executing the tracking range monitor processing.

At step S11, the processing unit 21 judges whether or not the tracking range movement amount D13 of the tracking data D1 of the head exceeds the previously set threshold value on the downstream side. Namely, it judges whether or not the tracking range R5 of the head moves further downstream from the borderline B2 (see FIG. 4) on the downstream side of the workpiece detection area R12. Then, where it judges that it exceeds the threshold value on the downstream side, it increments the value of the head by exactly 1 (step S12). Namely, it defines the tracking range R5 on the further upstream side from the tracking range R5 of the head at present by one as the tracking range R5 of the new head. When it judges that it does not exceed the threshold value on the downstream side, it skips step S12.

At step S13, the processing unit 21 judges whether or not the tracking range movement amount D13 of the tracking data D1 of Tail+1 exceeds the previously set threshold value on the upstream side. Namely, it judges whether or not the tracking range R5 on the further upstream side from the tracking range R5 of the tail by exactly one begins to enter the workpiece detection area R12 from the borderline B1 on the upstream side (see FIG. 4). Then, when it judges that this amount D13 exceeds the threshold value on the upstream side, the value of the tail is incremented by exactly 1 (step S14). Namely, it determines the tracking range R5 on the further upstream side from the tracking range R5 of the tail at present by exactly one as the tracking range R5 of the new tail. When it judges that it does not exceed the threshold value on the downstream side, it skips step S14.

Figure 7:
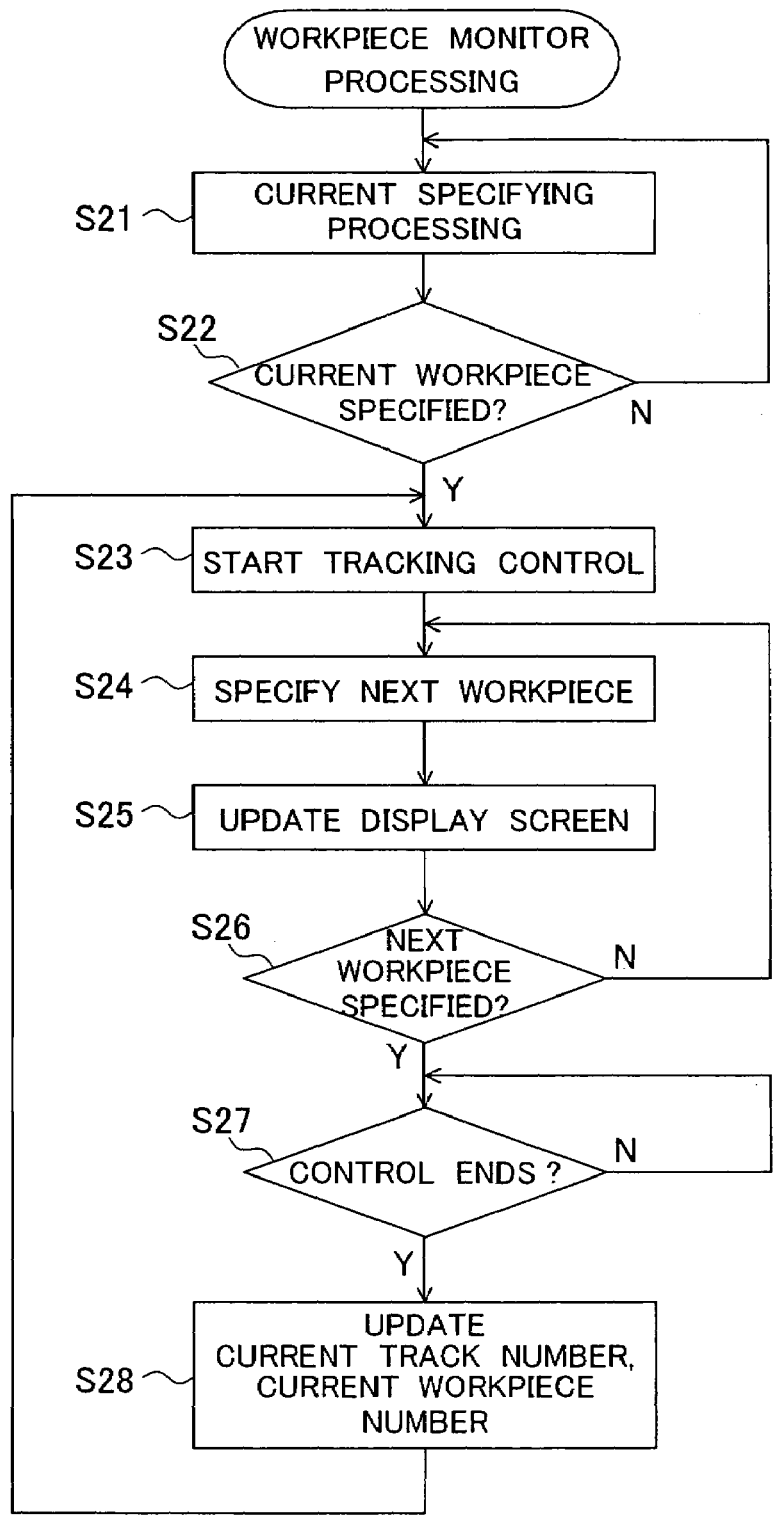
FIG. 7 is a flow chart of the routine of workpiece monitor processing executed by a robot controller of the handling system of FIG. 1.

FIG. 7 is a flow chart of the routine of the workpiece monitor processing executed by the processing unit 21 of the robot controller 6. This processing is started at the time of for example the activation of the handling system 1. The processing unit 21 of the robot controller 6 functions as the workpiece manager 21c when executing the workpiece monitor processing.

At step S21, the processing unit 21 executes the current specifying processing. The current specifying processing is processing for specifying the current track number and the current workpiece number. Namely, it is processing for specifying the current workpiece. Note that in the case where there is no workpiece 100 within the workpiece detection area R12, in the case where no workpieces 100 within the workpiece detection area R12 satisfy the search condition, and in the case where all workpieces 100 within the workpiece detection area R12 are already specified as current workpieces, no current workpiece is specified.

At step S22, the processing unit 21 judges whether or not a current workpiece is specified at step S21. When it judges that a current workpiece is specified, it inputs the current track number and the current workpiece number to the control routine (see FIG. 9) for pickup by the robot 5 in order to pick up the specified current workpiece (step S23). Due to this, tracking control of the robot 5 to the current workpiece is commenced. When it judges that the current workpiece is not specified, the processing unit 21 returns to step S21.

At step S24, the processing unit 21 specifies the track number and the workpiece number of the workpiece to next become the current workpiece. Note that this processing is actually carried out by execution of the same routine (see FIG. 8) as that of step S21.

At step S25, the processing unit 21 updates the screen of the display unit 24. Specifically, it updates the screen so that the content of the additional data D143 of the current workpiece, whether or not the workpiece to next become the current workpiece was specified, the content of the additional data D143 of the next current workpiece, etc. are displayed on the display unit 24. Due to this, the user can determine the types of workpieces etc. within the workpiece detection area R12, especially the type of the workpiece 100 to next become the current workpiece and therefore can sort and separate workpieces.

At step S26, the processing unit 21 judges whether or not the next workpiece was specified at step S24. When it judges that the next workpiece was not specified, the processing unit 21 returns to step S24. When it judges that the next workpiece was specified, it judges whether or not control for picking up and sorting the current workpieces started at step S23 has ended and the robot 5 can start tracking to the next workpiece and stands by until it judges that starting is possible (step S27). When it judges that starting is possible, the processing unit 21 determines the track number and the workpiece number of the next workpiece as the current track number and the current workpiece number (step S28), then returns to step S23 and starts the next tracking control.

Figure 8:
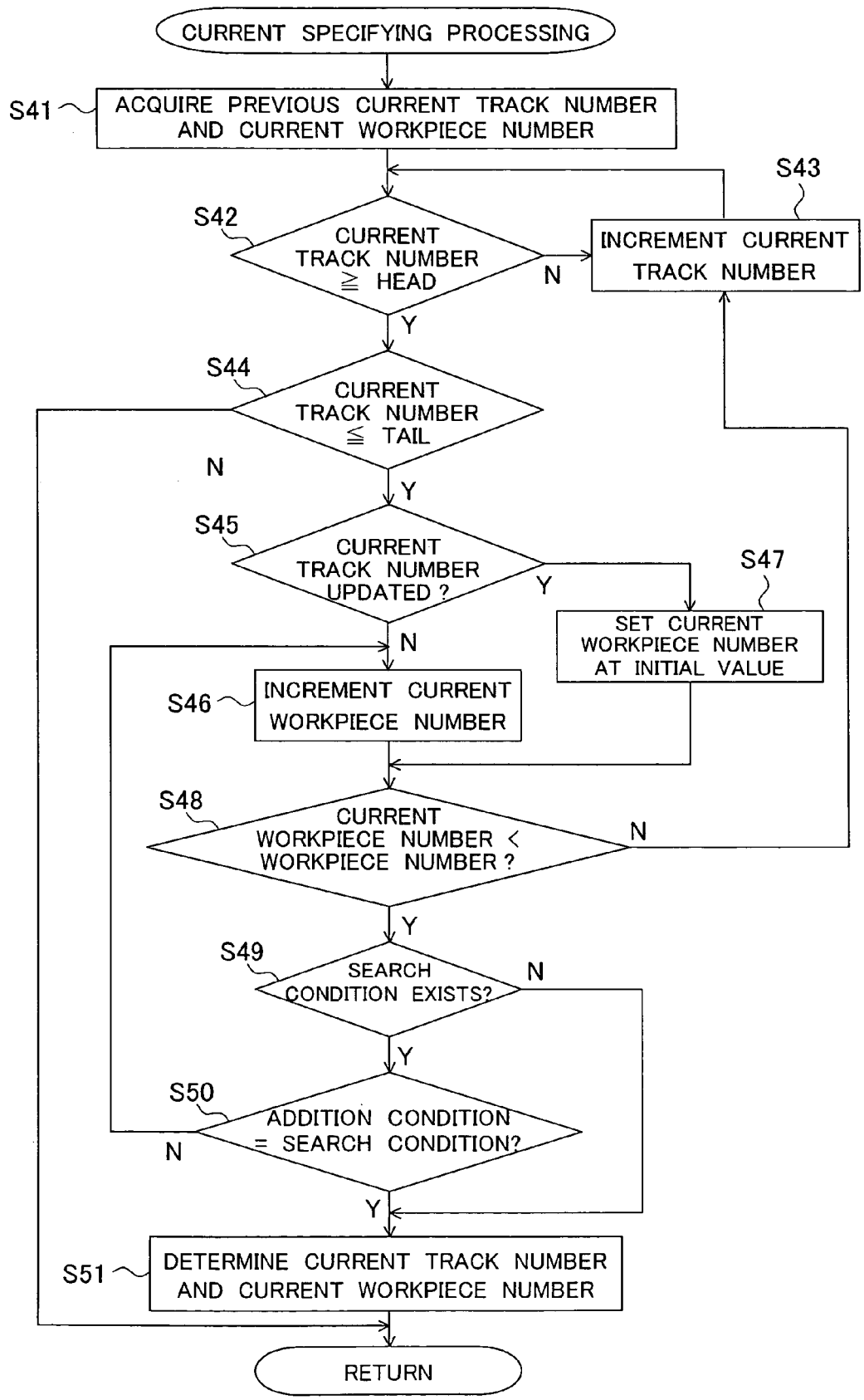
FIG. 8 is a flow chart of the routine of current specifying processing executed by a robot controller of the handling system of FIG. 1.

FIG. 8 is a flow chart of the routine of the current specifying processing executed at step S21 and step S24 in FIG. 7.

The processing unit 21 of the robot controller 6 acquires the current track number and the current workpiece number specified at the previous current specifying processing as the temporary current track number and current workpiece number. The acquisition of the previous current track number and current workpiece number is carried out for search of the workpieces 100 toward the upstream side using the current track numbers and the current workpiece numbers up to the previous time as the base point and specifying the next current track number and current workpiece number.

At step S42, the processing unit 21 judges whether or not the temporary current track number acquired at step S41 is the head or more. When it judges that this number is the head or more, the processing unit 21 proceeds to step S44, while when it judges that this number is not the head or more, it increments the temporary current track number by exactly 1 until this number becomes the head or more (step S43). Namely, it confirms whether or not the previous current track is still within the workpiece detection area R12. When the previous current track has already moved to the further downstream side from the workpiece detection area R12, it determines the tracking range R5 on the further upstream side by one as the temporary current track.

At step S44, the processing unit 21 judges whether or not the temporary current track number is the tail or less. When it judges that this number is the tail or less, it proceeds to step S45, while when it judges that this number is not the tail or less, it terminates the processing. Namely, it confirms whether or not the search of the workpieces 100 has proceeded to the upstream side from the workpiece detection area R12. When it has proceeded up to the upstream side from the workpiece detection area R12, it does not specify the current workpiece and terminates the processing. Note that, at this time, it sets a flag indicating that the current track number and the current workpiece number could not be specified. It refers to the flag at steps S22 and S26 in FIG. 7 for judgment processing.

At step S45, the processing unit 21 judges whether or not the temporary current track number was updated from the previous current track number. When it judges that this number was not updated, it increments the temporary current workpiece number by exactly one (step S46). Namely, it determines the workpiece number on the further upstream side from the previous current workpiece number by exactly one as the temporary current workpiece number. On the other hand, when it judges that the temporary current track number was updated, it sets the temporary current workpiece number at the initial value (for example 0) (step S47). Namely, it determines the workpiece number of the workpiece 100 on the downstream most side of the current track as the temporary current workpiece number.

At step S48, the processing unit 21 judges whether or not the temporary current workpiece number is smaller than the workpiece number D12 of the track data D1 of the temporary current track number. Namely, it confirms whether or not a workpiece of the temporary current workpiece number set at steps S46 and S47 actually exists.

When the processing unit 21 judges that the temporary current workpiece number is not smaller than the workpiece number D12, that is, when the detection of the workpieces already ends up to the upstream side of the current track, or when the workpiece does not exist in the current track, the processing unit 21 returns to step S43 and carries out the detection of workpieces for the tracking ranges R5 on the further upstream side.

When the processing unit 21 judges that the temporary current workpiece number is smaller than the workpiece number D12, it judges whether or not a search condition is set by the user (step S49). When it judges that a search condition is set, it refers to the additional data D143 of the workpiece data D14 of the temporary current workpiece number and judges whether or not the search condition is satisfied. For example, it judges whether or not the type of the workpiece 100 held in the additional data D143 and the type of the workpiece 100 previously set as the search condition coincide. When it is judges that the search condition is not satisfied, the processing unit 21 returns to step S46 and searches for the workpieces on the further upstream side.

When the processing unit 21 judges at step S49 that the search condition is not set or when it judges at step S50 that the search condition is satisfied, it outputs the temporary current track number and current workpiece number as the true current track number and current workpiece number (step S51) and terminates the processing.

Note that it is also possible to set the flag for the workpiece data D14 output as the current track and current workpiece number at step S51 or for the workpiece data D14 which enabled progress from step S48 to S49 and refer to the flag in the post-processing to thereby prevent the same workpiece from being specified as the current workpiece.

In the processing illustrated in FIG. 8, the search condition is an example of the selection conditions. Further, the search is carried out from the workpieces on the downstream side at steps S46 and S47, therefore the position on the further downstream side in the processing illustrated in FIG. 8 is an example of the selection conditions.

Figure 9:
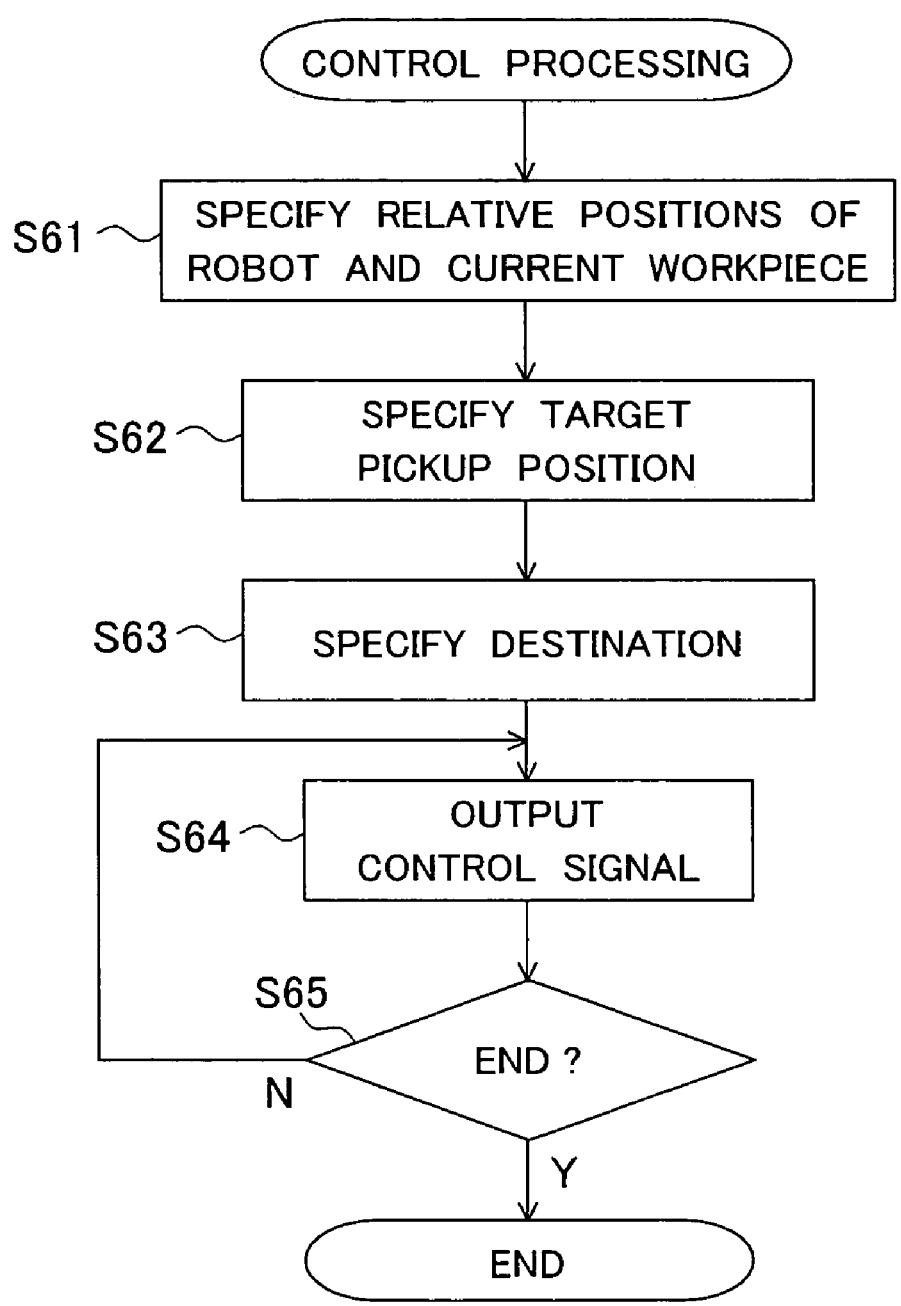
FIG. 9 is a flow chart of the routine of control processing executed by a robot controller of the handling system of FIG. 1.

FIG. 9 is a flow chart of the routine of the control processing executed by the processing unit 21 of the robot controller 6. This processing is started triggered by step S23 of FIG. 7. The processing unit 21 of the robot controller 6 functions as the controller 21d when executing the control processing.

The processing unit 21 of the robot controller 6 specifies the relative position of the current workpiece with respect to the imaging region R2 and accordingly the relative positions of the current workpiece and the robot 5 based on the tracking range movement amount D13 of the tracking data D1 of the current track number and the coordinate data D142 of the workpiece data D14 of the current workpiece number included in the tracking data D1.

At step S62, based on the relative position specified at step S61, the processing unit 21 calculates the distances in the x-axis direction and the y-axis direction etc. necessary for making the pickup part 5a of the robot 5 track the current workpiece and specifies the target position for picking up the current workpiece and the operation speed up to the target position.

At step S63, the processing unit 21 specifies the destination of the current workpiece picked up by the robot 5 with reference to the additional data D143 of the workpiece data D14 of the current workpiece number. For example, it refers to the type of the workpiece 100 held in the additional data D143 and searches for destinations previously recorded in the ROM etc. linked with the types of the workpieces 100 so that the workpiece 100 is conveyed to a different destination in accordance with its type and workpieces 100 are sorted into individual types.

At step S64, the processing unit 21 outputs the control signal to the robot 5 so as to move the pickup part 5a to the target pickup position set at step S62 and convey the workpiece to the destination specified at step S63. Then, it judges whether or not the end condition, for example, the pickup part 5a releasing the workpiece at the destination, is satisfied (step S65) and ends the processing when it judges that the end condition is satisfied.

Note that the destination is specified and the control is ended by interruption processing triggered by an operation by the user on the input unit 23. Alternatively, the settings may be changed. Due to this, for example the user can suitably sort workpieces etc. while obtaining information of the next workpiece by the screen updated at step S25 of FIG. 7.

In FIG. 4 to FIG. 9, the operations of one robot 5 and robot controller 6 were explained, but the explanation also is true for the case of a plurality of robots 5 and robot controllers 6. Note that a priority order is set for a plurality of robot controllers 6 and information is exchanged for the current track number and the current workpiece number among robot controllers 6. When the current track numbers and the current workpiece numbers overlap among the plurality of robot controllers 6, the robot controller 6 having the higher priority order picks up the workpiece 100 of the current track number and current workpiece number, and the robot controllers 6 having the lower priority order newly start specifying the current track numbers and current workpiece numbers so that the plurality of robots 5 will not follow the same workpiece 100.

According to the above handling system 1, the tracking manager 21b monitors the amount of movement from the imaging region R2 for the plurality of tracking ranges R5 and specifies the tracking range R5 passing the workpiece detection area R12, and the workpiece manager 21c selects the workpiece 100 to be picked up by the robot 5 from the inside of the tracking range R5 in the workpiece detection area R12. Namely, the handling system 1 selects the workpiece 100 to be handled by monitoring the relative positions of the workpieces 100 with respect to the robot 5 for each tracking range R5. Accordingly, the data concerning the workpieces 100 can be efficiently processed. For example, it is not necessary to monitor the amount of movement of each of the workpieces 100, and it is not necessary to specify the amount of movement of the tracking range R5 using the data of the workpieces 100 as the key. Also, troublesome processing for individual workpieces at positions relatively far from the robots 5 is eliminated.

In other words, in the handling system 1, efficient processing of the data is possible by managing the data of the workpieces 100 for each tracking range R5. For example, a plurality of tracking data D1 corresponding to individual tracking ranges R5 are generated, the tracking data D1 includes the tracking range movement amount D13 and the workpiece data D14, the workpiece data D14 includes the coordinate data D142, the data management unit 21a updates the tracking range movement amount D13 based on detection results of the encoder 4, the tracking manager 21b monitors the tracking range movement amount D13 and specifies the tracking data D1 of the tracking range R5 passing through the workpiece detection area R12, the workpiece manager 21c selects the workpiece data D14 from that specified tracking data D1, and the controller 21d specifies the position of the workpieces 100 based on the specified tracking data D1 and workpiece data D14, whereby the data is efficiently processed.

The visual sensor 3 generates the additional data D143 concerning the appearance of the workpieces 100 based on the captured images. The workpiece manager 21c selects a workpiece 100 satisfying the selection conditions with reference to the additional data D143. At this time, the search range is restricted to the tracking range R5 passing through the workpiece detection area R12, therefore a workpiece satisfying the selection conditions can be efficiently found. The same is true for sorting workpieces in accordance with the contents of the additional data D143 by the controller 21d. Further, the content of the additional data D143 of the current workpiece or the workpiece which becomes the current workpiece next is displayed in the display unit 24, and the position of the current workpiece etc. is restricted in the workpiece detection area R12, therefore it becomes easy for the user to determine which workpiece the information is displayed for on the display unit 24.

The present invention is not limited to the above embodiments and can be executed in various ways.

The present invention is not limited in application to a handling system. It may also be applied to a system selectively performing work on a plurality of articles conveyed along a conveyance path. For example, it may be applied to a system for selectively painting a plurality of articles conveyed by a conveyor.

The amount of movement of a tracking range may be monitored by any information enabling specification the relative position of the tracking range from the imaging region and is not limited to tracking data which is updated and referred to. For example, the amount of movement of the tracking range may be monitored by recording the count whenever imaging is carried out and subtracting the count at each imaging from the present count.

The detection area may be appropriately set in position, size, etc. so far as it is set in a part of the conveyance path and is not limited to the range of a part on the upstream side of the conveyer synchronizable area. For example, the upstream side borderline of the detection area may be located on the further upstream side from the upstream side borderline of the conveyer synchronizable area. Further, the position and size may be appropriately changed by the user etc. during the operation of the handling system etc.

The additional information specified by the visual sensor may be specified based on the image and is not limited to the type of the article. For example, it may be information of the presence of a fault obtained by a check of the appearance of the article.

The tracking data is sufficient so far as the information of the amount of movement of the tracking range and the information concerning the workpiece of the tracking range are held linked together. The data format etc. are not critical.

It should be understood by those skilled in the art that various modifications, combinations, sub-combinations and alterations may occur depending on design requirements and other factors insofar as they are within the scope of the appended claims or the equivalents thereof.

We claim:

1. A handling system comprising:
   a conveying part for moving a carrying part on which a plurality of articles are carried along a conveyance path and thereby conveying said plurality of articles;
   a visual sensor for repeating imaging of an imaging region set in said conveyance path at a predetermined time interval, acquiring an image of each of a plurality of tracking ranges obtained by dividing said carrying part in a conveyance direction, and detecting relative positions of articles within each tracking range with respect to each tracking range based on each acquired image;
   a movement amount detecting part for detecting an amount of movement of said carrying part;
   a tracking range monitoring part for monitoring the amounts of movement of said plurality of tracking ranges from said imaging region based on the amount of movement detected by said movement amount detecting part and specifying the tracking range passing through a predetermined detection area;
   an article selecting part for selecting an article satisfying a predetermined selection condition within the tracking range specified by said tracking range monitoring part;
   a handling part for following and selectively picking up articles selected by the article selecting part carried on said carrying part; and
   a controlling part for controlling the operation of said handling part so as to follow and pick up the article selected by said article selecting part based on the amount of movement detected by said movement amount detecting part and the relative positions detected by said visual sensor;
   wherein the system is further provided with a data managing part for generating a plurality of tracking data corresponding to individual tracking ranges and a storing part for storing said plurality of tracking data generated by said data managing part, said tracking data includes movement amount information able to specify the amount of movement of a corresponding tracking range from said imaging region, and, when there are any articles in the corresponding tracking range, further includes the same number of article data as the number of articles within the corresponding tracking range, said article data includes article position information able to specify the relative position of a corresponding article with respect to said tracking range, said data managing part updates said movement amount information stored in said storing part based on the amount of movement detected by said movement amount detecting part, the tracking range monitoring part monitors the amount movement of said tracking range from said imaging region with reference to said movement amount information of said tracking data and specifies the tracking data of the tracking range passing through said detection area, said article selecting part selects article data satisfying said selection condition with reference to the article data included in the tracking data specified by said tracking range monitoring part, and said controlling part specifies the relative position of said article with respect to said handling part based on said movement amount information included in the tracking data specified by said tracking range monitoring part and said article position information included in the article data selected by said article selecting part and makes said handling part follow said article.

2. A handling system as set forth in claim 1, wherein said visual sensor specifies additional information concerning the appearance of said article based on said image, said data managing part generates said tracking data so that said additional information of the article is included in the article data corresponding to the article, and said article selecting part selects the article data satisfying said selection condition with reference to said additional information of said article data included in the tracking data specified by said tracking range monitoring part.

3. A handling system as set forth in claim 1, wherein said visual sensor specifies additional information concerning the appearance of said article based on said image, said data managing part generates said tracking data so that said additional information of the article is included in the article data corresponding to the article, and said controlling part makes said handling part execute different operations in accordance with the content of the additional information with reference to the additional information of the article data selected by said article selecting part.

4. A handling system as set forth in claim 1, wherein the system is further provided with a display device for displaying predetermined information, said visual sensor specifies additional information concerning the appearance of said article based on said image, said data managing part generates said tracking data so that said additional information of the article is included in the article data corresponding to the article, and said display device displays the additional information of the article data selected by said article selecting part.

5. A handling system as set forth in claim 2, wherein said additional information is information able to specify the type of said article.

6. A work system comprising:
   a conveying part for moving a carrying part on which a plurality of articles are carried along a conveyance path and thereby conveying said plurality of articles;

a visual sensor for repeating imaging of an imaging region set in said conveyance path at a predetermined time interval, acquiring an image of each of a plurality of tracking ranges obtained by dividing said carrying part in a conveyance direction, and detecting relative positions of articles within each tracking range with respect to each tracking range based on each acquired image;

a movement amount detecting part for detecting an amount of movement of said carrying part;

a tracking range monitoring part for monitoring the amounts of movement of said plurality of tracking ranges from said imaging region based on the amount of movement detected by said movement amount detecting part and specifying the tracking range passing through a predetermined detection area;

an article selecting part for selecting an article satisfying a predetermined selection condition within the tracking range specified by said tracking range monitoring part;

a work part for selectively performing work on the article selected by the article selecting part carried on said carrying part; and a controlling part for controlling the operation of said work part so as to perform work on the article selected by said article selecting part based on the amount of movement detected by said movement amount detecting part and the relative positions detected by said visual sensor;

wherein the system is further provided with a data managing part for generating a plurality of tracking data corresponding to individual tracking ranges and a storing part for storing said plurality of tracking data generated by said data managing part, said tracking data includes movement amount information able to specify the amount of movement of a corresponding tracking range from said imaging region, and, when there are any articles in the corresponding tracking range, further includes the same number of article data as the number of articles within the corresponding tracking range, said article data includes article position information able to specify the relative position of a corresponding article with respect to said tracking range, said data managing part updates said movement amount information stored in said storing part based on the amount of movement detected by said movement amount detecting part, the tracking range monitoring part monitors the amount movement of said tracking range from said imaging region with reference to said movement amount information of said tracking data and specifies the tracking data of the tracking range passing through said detection area, said article selecting part selects article data satisfying said selection condition with reference to the article data included in the tracking data specified by said tracking range monitoring part, and said controlling part specifies the relative position of said article with respect to said handling part based on said movement amount information included in the tracking data specified by said tracking range monitoring part and said article position information included in the article data selected by said article selecting part and makes said handling part follow said article.

7. A handling system as set forth in claim 1 wherein:
   said tracking range monitoring part specifies one of said tracking ranges as a head tracking range and one of said tracking ranges as a tail tracking range; and
   said article selecting part selects said article within a region from said head tracking range to said tail tracking range.

8. A work system as set forth in claim 6 wherein:
   said tracking range monitoring part specifies one of said tracking ranges as a head tracking range and one of said tracking ranges as a tail tracking range; and
   said article selecting part selects said article within a region from said head tracking range to said tail tracking range.

* * * * *